United States Patent
Galloway

(10) Patent No.: US 10,368,528 B2
(45) Date of Patent: Aug. 6, 2019

(54) PET BED

(71) Applicant: Doskocil Manufacturing Company, Inc., Arlington, TX (US)

(72) Inventor: Christine Galloway, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 277 days.

(21) Appl. No.: 15/064,728

(22) Filed: Mar. 9, 2016

(65) Prior Publication Data

US 2017/0258036 A1    Sep. 14, 2017

(51) Int. Cl.
*A01K 1/035*    (2006.01)

(52) U.S. Cl.
CPC .................. *A01K 1/0353* (2013.01)

(58) Field of Classification Search
CPC .............................. A01K 1/035; A01K 1/0353
USPC ......................................................... 119/28.5
See application file for complete search history.

(56) References Cited

U.S. PATENT DOCUMENTS

| 4,959,880 | A | * | 10/1990 | Tesch | A47G 9/10 |
| | | | | | 5/490 |
| 5,455,973 | A | * | 10/1995 | Brumfield | A47D 5/00 |
| | | | | | 5/424 |
| 2006/0272581 | A1 | * | 12/2006 | Dunn | A01K 1/0353 |
| | | | | | 119/28.5 |
| 2006/0272582 | A1 | * | 12/2006 | Dunn | A01K 1/0353 |
| | | | | | 119/28.5 |
| 2009/0293198 | A1 | * | 12/2009 | Fodge | A47C 31/10 |
| | | | | | 5/653 |
| 2012/0118239 | A1 | * | 5/2012 | Jacquart | A01K 1/0353 |
| | | | | | 119/28.5 |
| 2013/0247828 | A1 | * | 9/2013 | Tedaldi | A01K 1/0353 |
| | | | | | 119/28.5 |
| 2016/0106061 | A1 | * | 4/2016 | Nelson | A01K 1/0353 |
| | | | | | 119/28.5 |
| 2016/0192617 | A1 | * | 7/2016 | Murphy | A01K 1/0353 |
| | | | | | 119/28.5 |
| 2017/0118950 | A1 | * | 5/2017 | Xu | A01K 1/0353 |
| 2017/0280679 | A1 | * | 10/2017 | Swedyk | A01K 13/001 |

FOREIGN PATENT DOCUMENTS

WO    WO-2012112731 A2 *    8/2012    .......... A01K 1/0353

* cited by examiner

*Primary Examiner* — Monica L Williams
*Assistant Examiner* — Aaron M Rodziwicz
(74) *Attorney, Agent, or Firm* — Global IP Counselors, LLP

(57) ABSTRACT

A pet bed includes a base and a reversible cover. The base includes a case. The reversible cover is attached to the base, and includes a first side defining a first external surface of the reversible cover, and a second side opposite the first side and defining a second external surface of the reversible cover. The reversible cover is configured to switchably cover the case, such that the first side of the reversible cover contacts the case in a first configuration of the reversible cover to externally expose the second surface from the pet bed, and the second side of the reversible cover contacts the first and second sides of the case in a second configuration of the reversible cover to externally expose the first surface from the pet bed.

11 Claims, 8 Drawing Sheets

PET BED

BACKGROUND

Field of Invention

This invention generally relates to a pet bed. More specifically, the present invention relates to a pet bed which includes a reversible cover.

Background Information

Generally, a pet bed provides a soft area for which a pet, such as a dog or cat, may rest. Pet beds conventionally have a cushioned area upon which a pet may sit or lay comfortably.

SUMMARY

It has been found that to improve pet beds, a pet bed can include a base and a reversible cover. The base includes a case. In one embodiment, the reversible cover is attached to the base, and includes a first side defining a first external surface of the reversible cover, and a second side opposite the first side and defining a second external surface of the reversible cover. The reversible cover is configured to switchably cover the case, such that the first side of the reversible cover contacts the case in a first configuration of the reversible cover to externally expose the second surface from the pet bed, and the second side of the reversible cover contacts the first and second sides of the case in a second configuration of the reversible cover to externally expose the first surface from the pet bed.

BRIEF DESCRIPTION OF THE DRAWINGS

Referring now to the attached drawings which form a part of this original disclosure.

DETAILED DESCRIPTION OF THE EMBODIMENTS

Figure 1:
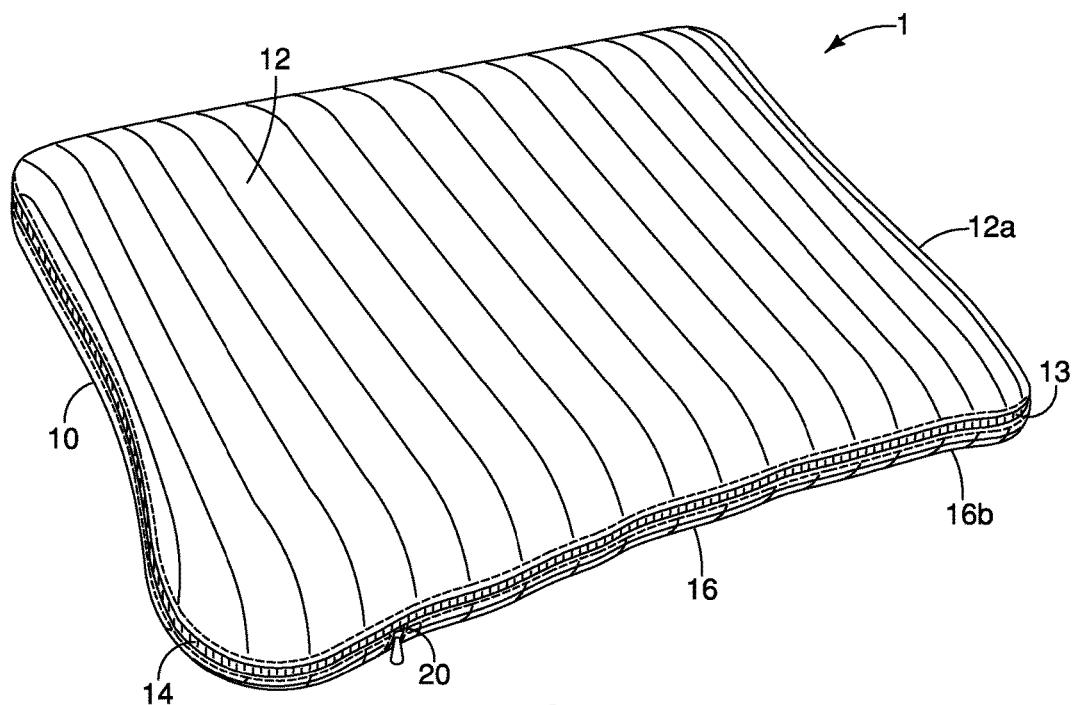
FIG. 1 is a perspective view of a pet bed in accordance with a first embodiment.
Figure 2:
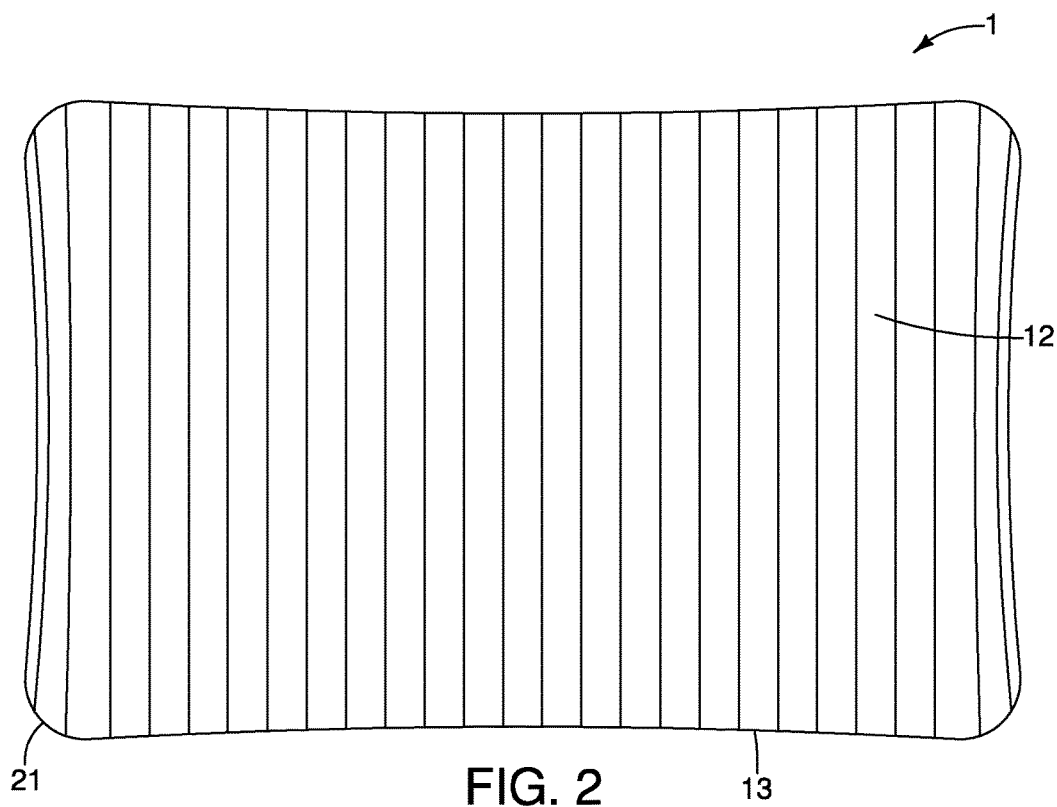
FIG. 2 is a top plan view of the of a pet bed in accordance with the first embodiment.
Figure 3:
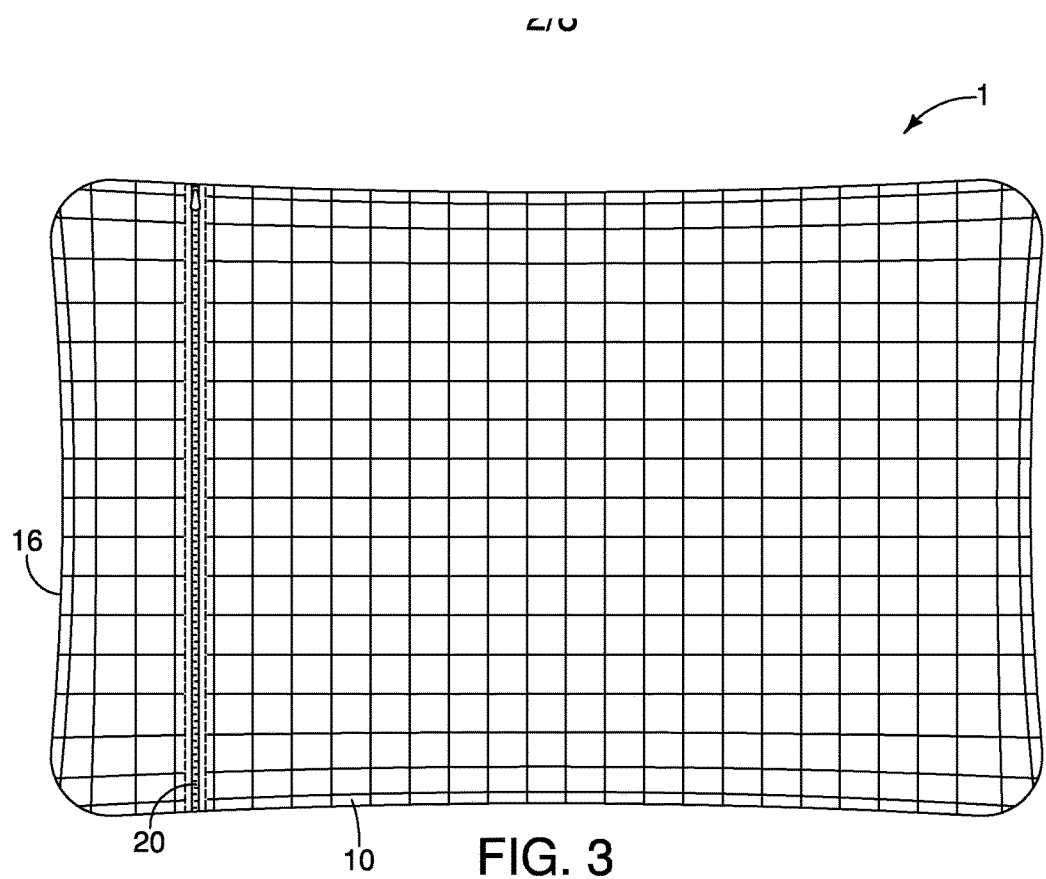
FIG. 3 is a bottom plan view of the pet bed in accordance with the first embodiment.

Selected embodiments of the present invention will now be explained with reference to the drawings.

Referring to FIGS. 1-4, a pet bed 1 according to a first embodiment of the present invention is shown. In this embodiment, the pet bed 1 includes a base 10 attached to a reversible cover 12. The pet bed 1 of the first embodiment is in a substantially rectangular shape, but any conventional shape of pet bed may be used.

The base 10 and the reversible cover 12 are attached about a periphery 13 of the reversible cover 12 using a binding 14. The binding 14 in this embodiment is a zipper 14. The zipper 14 can be a conventional zipper comprising a first tape 15 and a second tape 17, each tape 15 and 17 having a set of teeth, and a slider 19 which engages and disengages the sets of teeth. The first tape 15 is attached to (e.g., sewn around) the periphery 13 of the reversible cover 12, and the second tape 17 is attached to (e.g., sewn around) the periphery 21 of the base 10 to match or correspond to the shape of the periphery 13 of the reversible cover 12. In this embodiment, the periphery 13 of the reversible cover 12 is substantially the same shape as a periphery 21 of the base 10. Alternative arrangements, in which the periphery 21 of the base 10 and the periphery 13 of the reversible cover 12 would be understood in light of this disclosure, are not illustrated.

Figure 4:
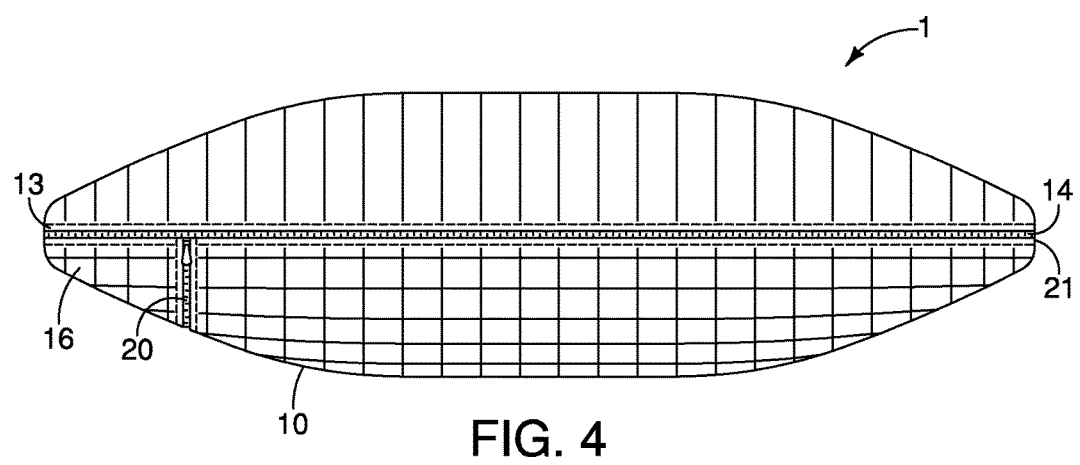
FIG. 4 is a side elevational view of the pet bed in accordance with the first embodiment.
Figure 5A:
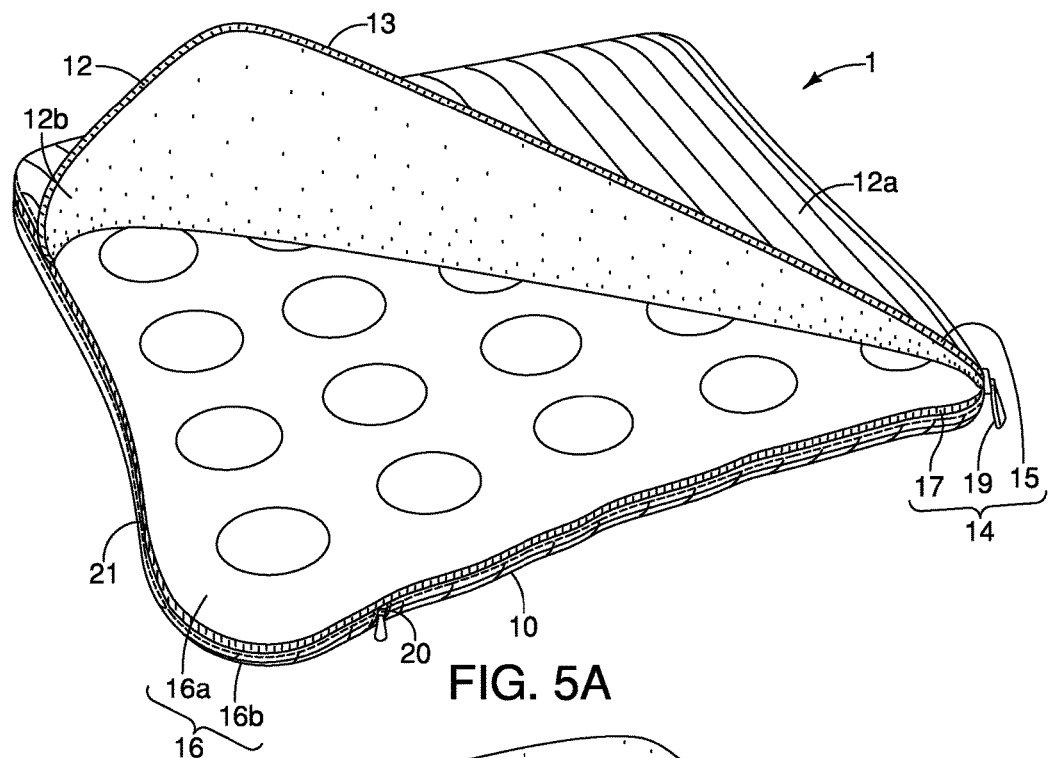
FIG. 5A is a perspective view of the pet bed with a reversible cover partially removed in accordance with the first embodiment.
Figure 5B:
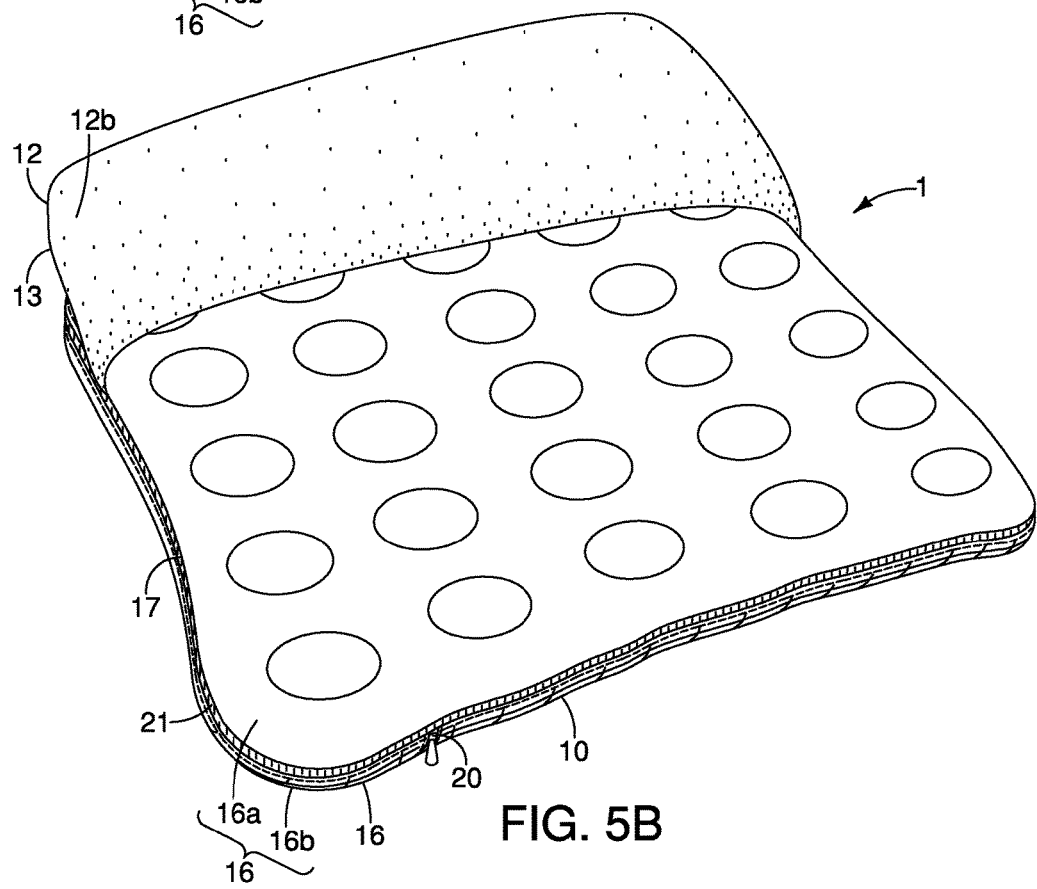
FIG. 5B is a perspective view of the pet bed with the reversible cover partially removed in accordance with the first embodiment.
Figure 5C:
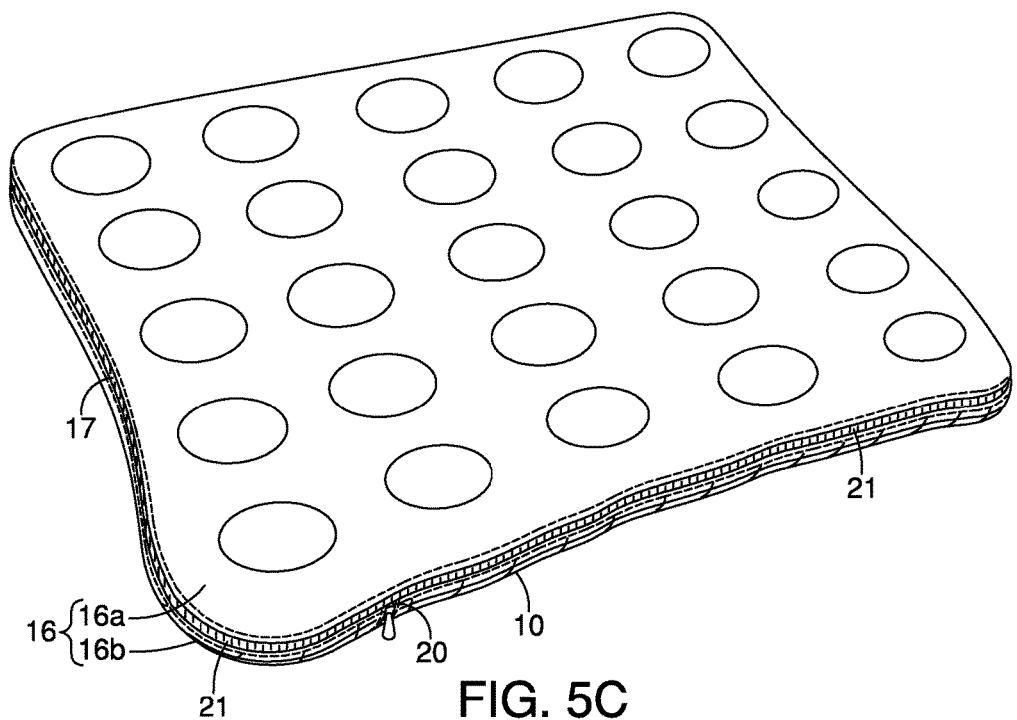
FIG. 5C is a perspective view of the pet bed with the reversible cover completely removed in accordance with the first embodiment.
Figure 6A:
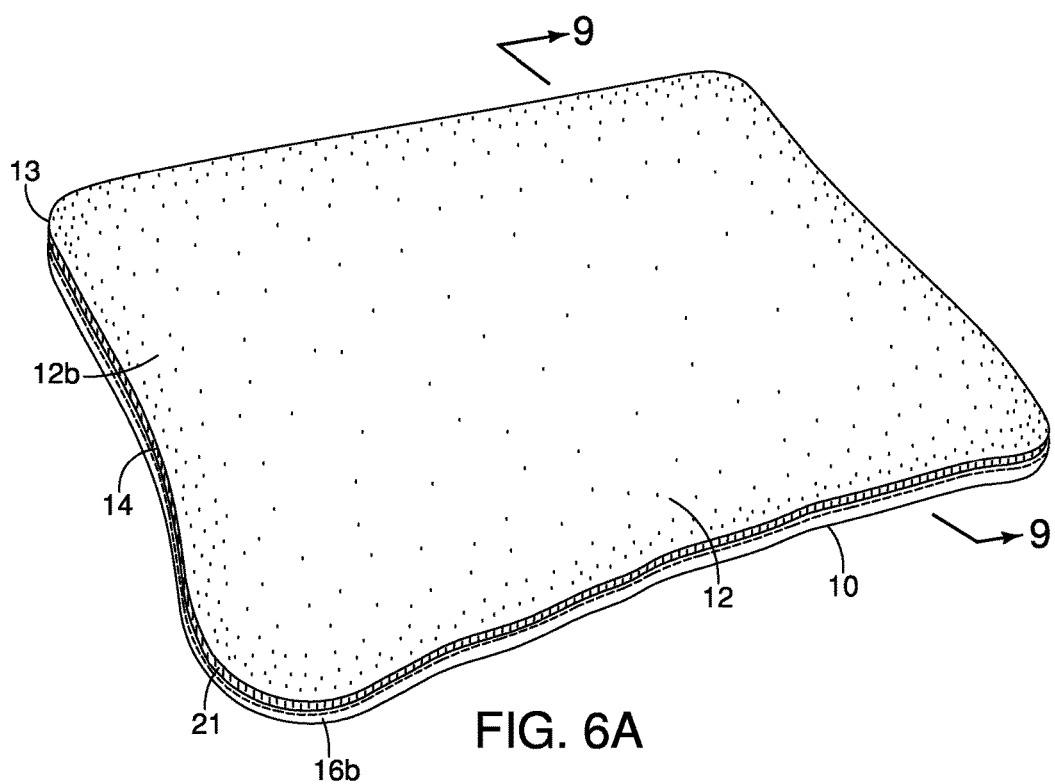
FIG. 6A is a top plan view of the pet bed with the reversible cover arranged in a second configuration.
Figure 6B:
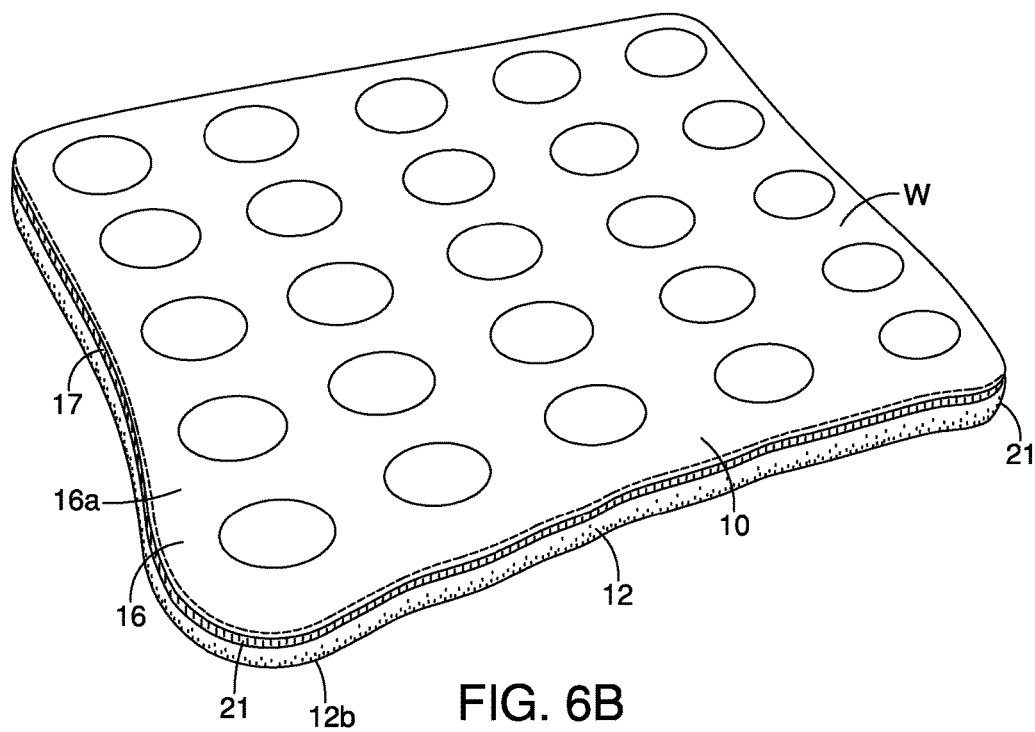
FIG. 6B is a bottom plan view of the pet bed with the reversible cover arranged in a second configuration.

As illustrated in FIGS. 4 and 5A to 5C, the reversible cover 12 may be completely attached, partially attached, or completely detached from the base 10. In FIG. 4, the reversible cover 12 is attached to the base 10 about the entire periphery 13 of the reversible cover 12. In FIGS. 5A and 5B, the reversible cover 12 is attached to the base 10 about part of the periphery 13 of the reversible cover 12. In this state, the reversible cover 12 may be flipped, to cover an opposite side of the base 10, while partially attached to the base 10 as illustrated in FIGS. 6A and 6B. Alternatively, the reversible cover 12 may be completely removed from the base 10 as illustrated in FIGS. 5C and 7A-7C.

As shown in FIGS. 5A and 5B, the base 10 includes a case 16. The case 16 includes at least a first side 16a and a second side 16b. The first side 16a and the second side 16b define exterior surfaces of the base 10, and face in opposite directions as illustrated in FIG. 5C. The case 16 of the illustrated embodiment is made of fabric generally used for pet beds. The materials of the first side 16a and the second side 16b may be the same material, or different materials. The difference in materials may be differences of any combination of pattern, texture, color, and composition. In the illustrated embodiment, the second tape 17 of zipper 14 is sewn about the periphery 21 of the base 10, which is also where the first side 16a and the second side 16b are joined.

Figure 8:
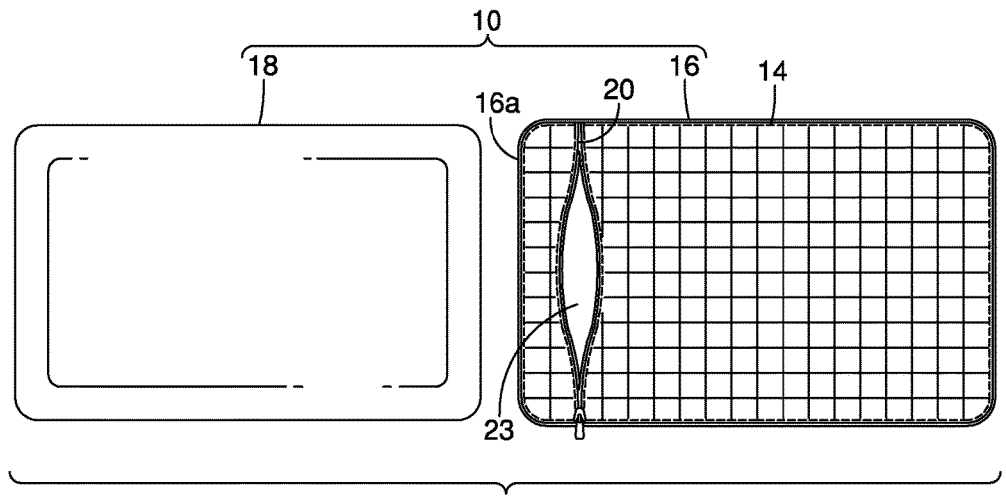
FIG. 8 is a perspective view of the pet bed and cushion of the pet bed in accordance with the first embodiment.
Figure 9A:
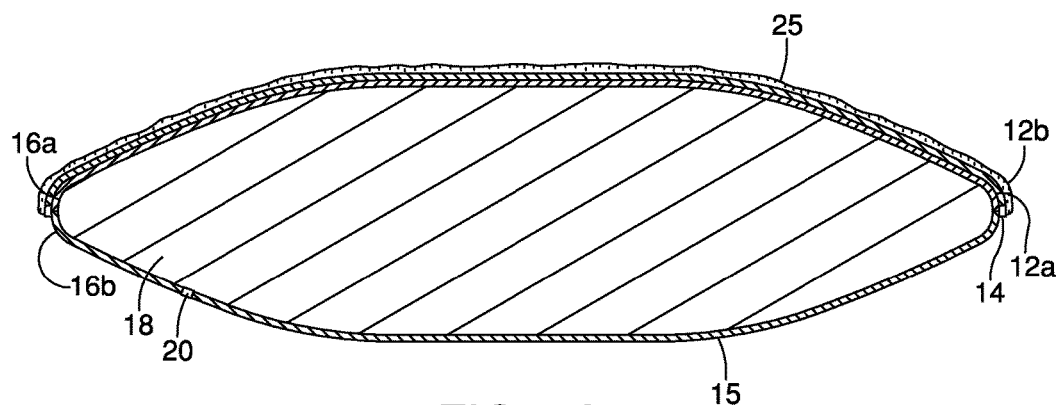
FIG. 9A is a longitudinal cross section of a first configuration of the pet bed in accordance with the first embodiment.
Figure 9B:
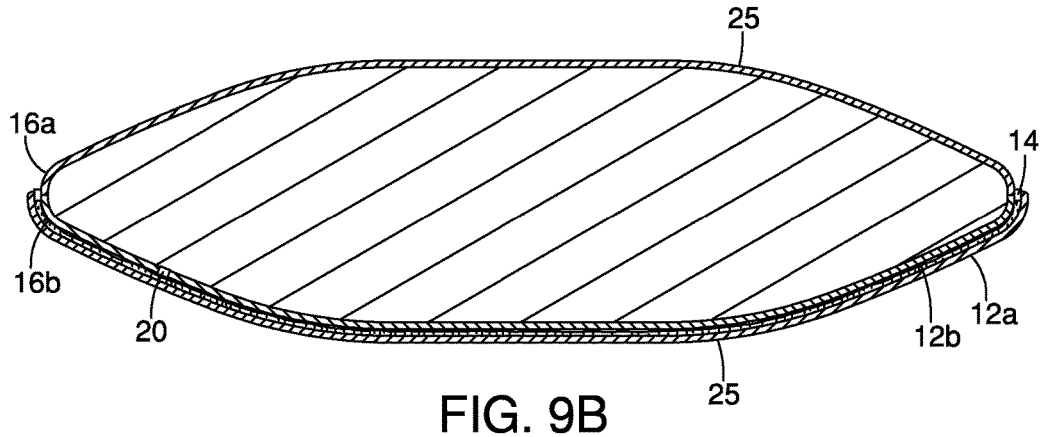
FIG. 9B is a longitudinal cross section of a second configuration of the pet bed in accordance with the first embodiment.
Figure 9C:
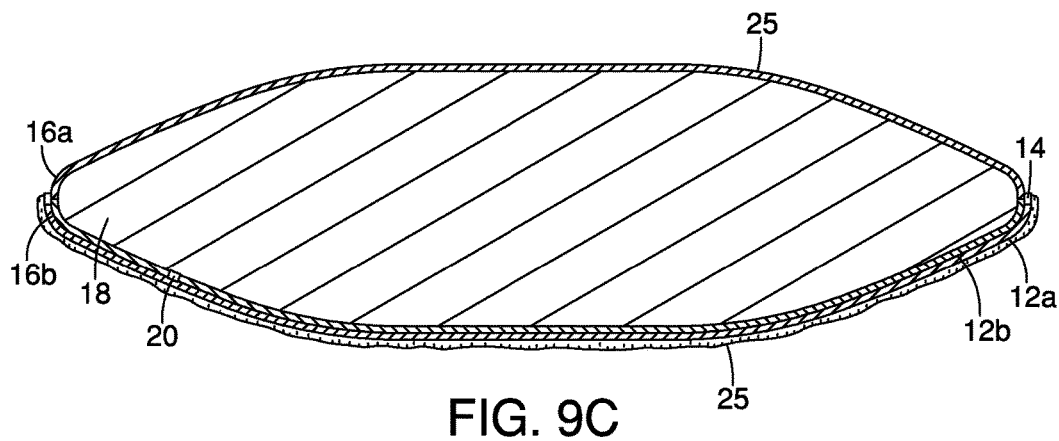
FIG. 9C is a longitudinal cross section of a third configuration of the pet bed in accordance with the first embodiment.
Figure 9D:
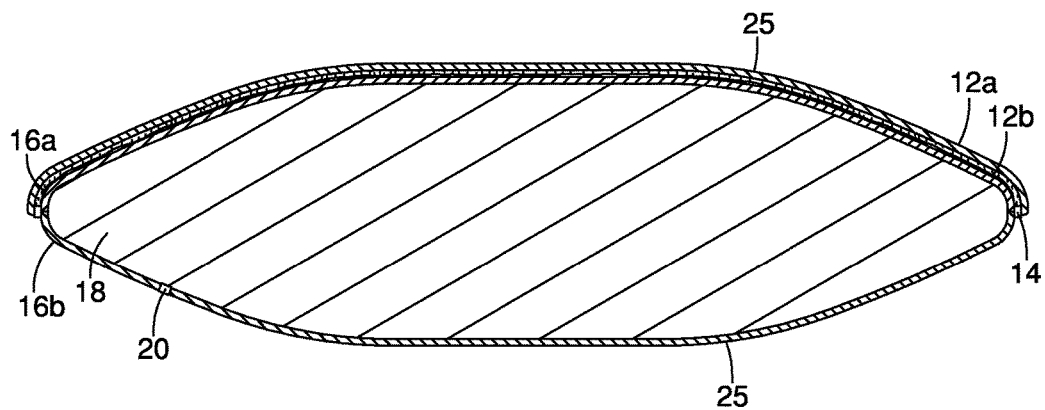
FIG. 9D is a longitudinal cross section of a fourth configuration of the pet bed in accordance with the first embodiment.

As illustrated in FIGS. 8 to 9D, the base 10 may also include a cushion 18. The cushion 18 is disposed inside of the case 16, between the first side 16a and second side 16b. The cushion 18 of the illustrated embodiment is made of a fabric encasing a filler. Both the fabric and filler can be conventional materials used for cushions of pet beds such as cotton and polyester.

In one embodiment, as shown in FIG. 8, the base 10 may also include a closable opening 20. The closable opening 20 allows for access to the interior 23 of the case 16. This would allow the insertion and removal of cushion 18 into/from the case 16. In this embodiment, the closable opening 20 can include a zipper which enables the opening to be opened and closed, though alternative conventional arrangements or closing devices may also be used, as would be apparent in light of this disclosure.

Figure 7A:
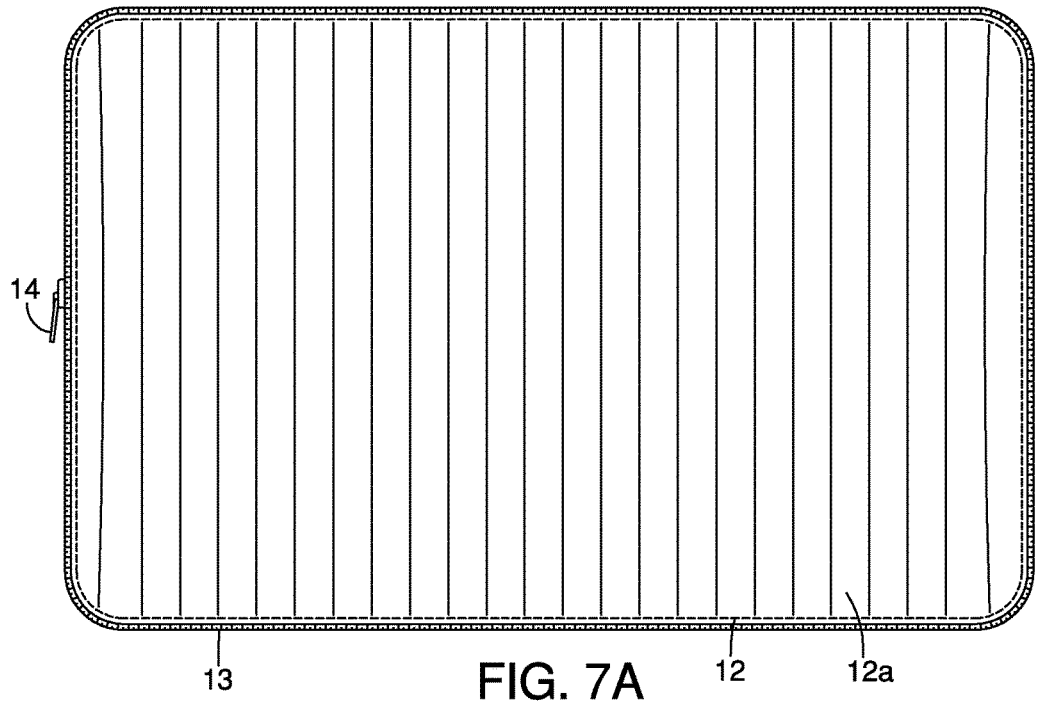
FIG. 7A is a top plan view of the reversible cover in accordance with the first embodiment.
Figure 7B:
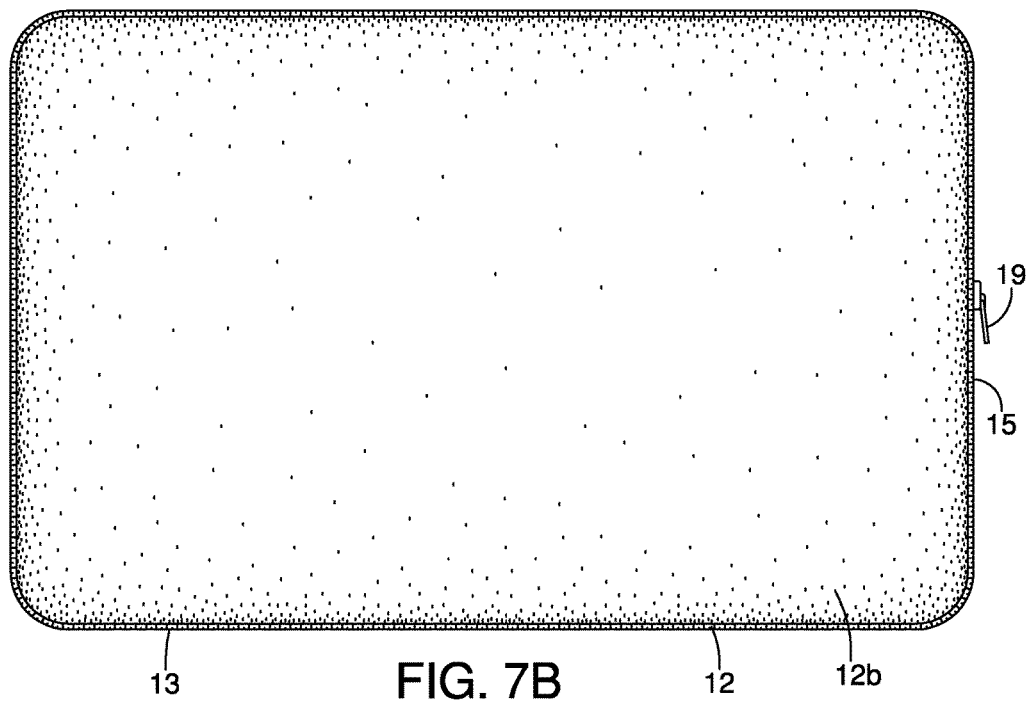
FIG. 7B is a bottom plan view of the reversible cover in accordance with the first embodiment.
Figure 7C:
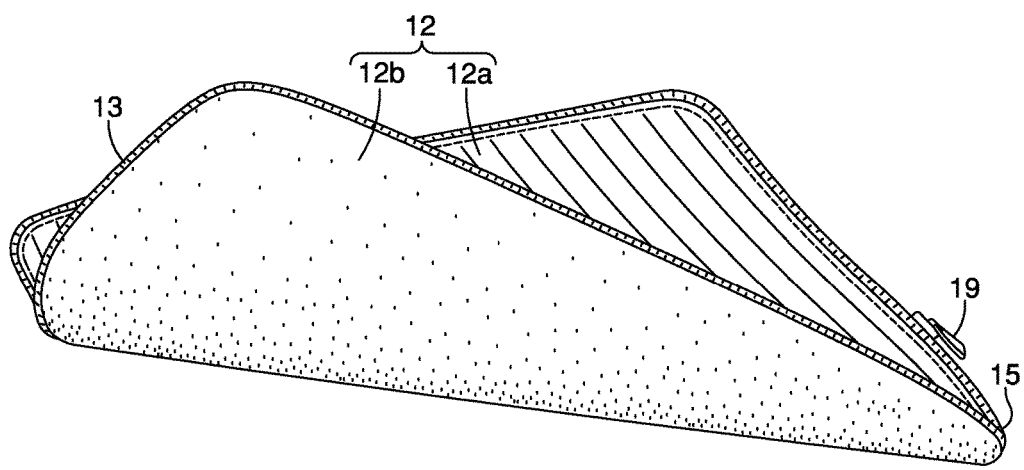
FIG. 7C is a perspective view of the reversible cover in accordance with the first embodiment.

As illustrated in FIGS. 7A-7C, the reversible cover 12 includes a first side 12a and a second side 12b. In the illustrated embodiment, the first tape 15 from the zipper 14 is attached about the periphery 13 of the reversible cover 12. Alternatively, a portion of the periphery 13 of the reversible cover 12 may be permanently attached to the base 10, and the remainder of the periphery 13 of the reversible cover 12 may be removably attached to the base 10 (not illustrated). The reversible cover 12 is made of materials conventionally used in pet beds. The materials of the first side 12a and the second side 12b may be the same material, or different materials. The difference in materials may be differences of any combination of pattern, texture, color, and composition. In the illustrated embodiment, a first tape 15 of zipper 14 is attached to (e.g., sewn about) the periphery 21 of the base 10, which is also where the first side 12a and the second side 12b are joined. In the illustrated embodiment, the first side 12a is a smooth fabric, and the second side 12b is a plush fabric. While the slider 19 of the zipper 14 is illustrated as being attached to the reversible cover 12, the slider 19 may be attached to the base 10 instead, as would be understood in light of this disclosure. In addition, the slider 19 of the zipper 14 is preferably a double sided slider allowing the slider to be operated by a user from either the first side 12a or from the second side 12b.

Various arrangements of the pet bed 1 will now be described referring to FIGS. 9A-9D. FIG. 9A illustrates a configuration of the pet bed in which the first side 12a of the reversible cover 12 contacts the first side 16a of the case 16. The second side 12b of the reversible cover 12 and the second side 16b of the case 16 define exterior surfaces 25 of the pet bed 1.

FIG. 9B illustrates a second configuration of the pet bed 1. In the second configuration of the pet bed 1, the second side 12b of the reversible cover 12 contacts the second side 16b of the case 16. The first side 12a of the reversible cover 12 and the first side 16a of the case 16 define the exterior surface of the pet bed 1.

FIG. 9C illustrates a third configuration of the pet bed 1. In the third configuration of the pet bed 1, the second side 12b of the reversible cover 12 contacts the first side 16a of the case 16. The first side 12a of the reversible cover 12 and second side 16b of the case 16 define the exterior surfaces 25 of the pet bed 1.

FIG. 9D illustrates a fourth configuration of the pet bed 1. In the fourth configuration of the pet bed 1, the second side 12b of the reversible cover 12 contacts the first side 16a of the case 16. The first side 12a of the reversible cover 12 and the second side 16b of the case 16 defines the exterior surfaces 25 of the pet bed 1.

Referring to FIGS. 1, 5A, 5B, and 6A, a process for reversing the reversible cover 12 will now be described. For the purposes of the description of the process, FIG. 1 is an initial state of the pet bed 1 in which the reversible cover 12 is fully zipped to case 16, and the first side 12a of the reversible cover 12 and the second side 16b of the case define the exterior surfaces of the pet bed 1. In a first step illustrated in FIG. 5A, the zipper 14 is partially unzipped, exposing the second side 12b of the reversible cover 12 and the first side 16a of the case 16. Preferably, the zipper 14 is unzipped for greater than or equal to 50%, and less than fully unzipped, about the periphery 13 of the reversible cover 12 as illustrated in FIG. 5B. The second side 12b of the reversible cover 12 and first side 16a of the case 16 can be pulled or pushed out while the zipper 14 is less than fully unzipped. After the second side 12b of the reversible cover 12 and first side 16a of the case 16 have pulled or pushed out, the zipper 14 can be fully zipped while the pet bed 1 is in a state in which the second side 12b of the reversible cover 12 and the first side 16a of the case define the exterior surfaces of the pet bed 1 as illustrated in FIG. 6A. This process can be reversed to return the pet bed 1 to the initial state. As would be apparent, in light of this disclosure, the process of reversing the pet bed can be achieved when the zipper 14 encircles less than the entire periphery 13 of the reversible cover. Alternatively, as shown in the illustrated embodiment, the reversible cover 12 may be completely removed from the case 16 and then reattached in any of the configurations discussed above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. A pet bed comprising:
a base including a case that is defined by a first side and a second side, the first and second sides facing opposite directions from the case with respect to each other;
a zipper including a first tape having a set of teeth and a second tape having another set of teeth; and
a reversible cover removably attached to the base by the zipper, the first tape being disposed on the base and the second tape being disposed on the cover, the cover further including a first side defining a first external surface of the reversible cover, and a second side opposite the first side and defining a second external surface of the reversible cover,
the reversible cover configured to switchably cover the case,
in a first configuration of the pet bed, the first side of the reversible cover contacts the first side of the case, and the second side of the reversible cover and the second side of the case define an exterior surface of the pet bed, and
in a second configuration of the pet bed, the second side of the reversible cover contacts the second side of the case, and the first side of the reversible cover and the first side of the case define another exterior surface of the pet bed.

2. The pet bed of claim 1 wherein:
the base further includes a cushion disposed inside of the case.

3. The pet bed of claim 2 wherein:
the case includes an opening that allows insertion and removal of the cushion.

4. The pet bed of claim 1 wherein:
the first side of the case is composed of a different material than the second side of the case.

5. The pet bed of claim 1 wherein:
the first side of the reversible cover is composed of a different material than the second side of the reversible cover.

6. The pet bed of claim 5 wherein:
the first side of the reversible cover includes a plush material.

7. The pet bed of claim 1 wherein:
the base further includes a first side defining a first external surface of the base, and a second side opposite the first side and defining a second external surface of the base.

8. The pet bed of claim 7 wherein:
in a third configuration of the pet bed, the second side of the reversible cover contacts the first side of the case, and the first side of the reversible cover defines an exterior surface of the pet bed, and
in a fourth configuration of the pet bed, the first side of the reversible cover contacts the second side of the case, and the second side of the reversible cover defines an exterior surface of the pet bed.

9. The pet bed of claim 1 wherein:
the reversible cover is machine washable.

10. The pet bed of claim 1 wherein:
the reversible cover and the case are machine washable.

11. The pet bed of claim 2 wherein:
the pillow is disposed between the first and second sides of the case.

\* \* \* \* \*